Oct. 27, 1970 J. S. GERIG 3,537,077

RECIRCULATING FREQUENCY MEMORY SYSTEM

Filed June 13, 1967 8 Sheets-Sheet 1

INVENTOR.
JOHN S. GERIG
BY
Schulze Blair & Benoit

INVENTOR.
JOHN S. GERIG
BY
Schulze, Blair & Benoit

*INVENTOR.*
JOHN S. GERIG
*BY*
Schulze, Blair & Benoit

INVENTOR.
JOHN S. GERIG
BY
Schulze Blair + Benoit

INVENTOR.
JOHN S. GERIG
BY
Schulze Blair & Benoit

INVENTOR.
JOHN S. GERIG

BY

Schulze Blair + Benoit

INVENTOR.
JOHN S. GERIG
BY
Schulze Blair & Benoit

Oct. 27, 1970 J. S. GERIG 3,537,077

RECIRCULATING FREQUENCY MEMORY SYSTEM

Filed June 13, 1967 8 Sheets-Sheet 8

INVENTOR.
JOHN S. GERIG
BY
Schulze, Blair & Benoit

United States Patent Office 3,537,077
Patented Oct. 27, 1970

3,537,077
RECIRCULATING FREQUENCY MEMORY SYSTEM

John S. Gerig, McLean, Va., assignor to Scope Incorporated, Falls Church, Va., a corporation of New Hampshire Filed June 13, 1967, Ser. No. 645,789
Int. Cl. G11c *21/00*
U.S. Cl. 340—173 4 Claims

ABSTRACT OF THE DISCLOSURE

A memory system which accepts a pulsed microwave signal having a carrier frequency falling within a broad frequency band and by means of a loop-connected amplifier, frequency selective threshold and delay line, provides a frequency memory for arbitrary time intervals and for a number of frequencies simultaneously.

This invention relates generally to frequency memory systems and more particularly to a recirculating microwave memory system.

In conventional microwave recirculating memories retention is limited by phase instabilities to time intervals measured in tens of microseconds.

An object of the present invention is to provide a memory which will accept a pulsed microwave signal having a carrier frequency falling anywhere within a broad frequency band and will make available a CW output at essentially the carrier frequency of the pulsed signal with a reaction time of less than a microsecond. Further, the output will continue until quenched by an external control signal. Either one-at-a-time frequency memorization or a capability of storing a number of frequencies corresponding to pulse signals received simultaneously or serially is possible. Erasure of stored frequencies can occur either selectively or simultaneously.

These and other objects will become apparent from the following description taken together with the drawings wherein.

Figure 1:
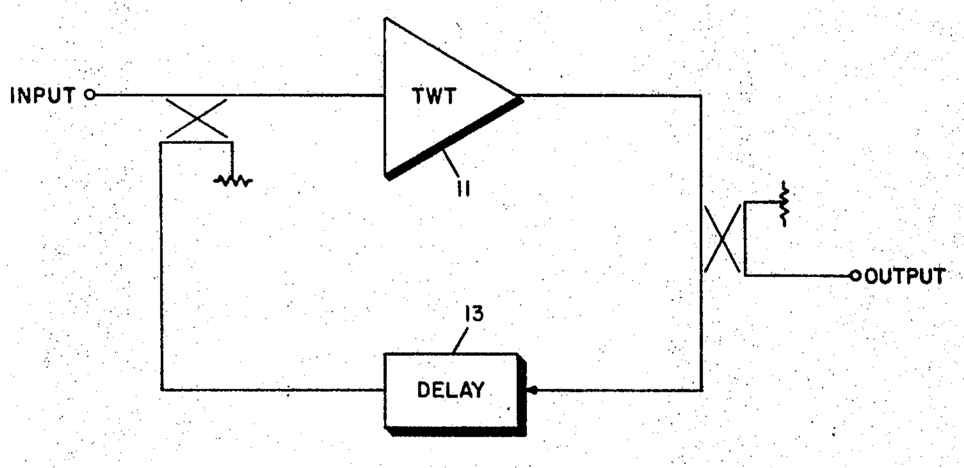
FIG. 1 is a schematic representation of a basic recirculating memory system known in the art.

For purposes of exposition, it is useful to begin with a review of the operating characteristics and limitations of a conventional recirculating memory. Such a system is illustrated in FIG. 1 and includes amplifier 11 and delay line 13. The criterion for oscillation includes the requirement that the net phase shift in the loop be an integral multiple of 360°. If the phase delay around the loop, presumably due largely to a microwave delay line 13, is called T, oscillation will be possible at any of a set of frequencies separated by the interval $\Delta F=1/T$. Thus a ½ μsec. delay will correspond to a mode spacing of two mc.p.s.

In addition to the phase condition, there is the requirement that the loop gain at each mode frequency exceed unity for sustained oscillation to occur at that frequency. Imperfections in the fabrication of the RF components will inevitably cause some irregularity in the gain-versus-frequency characteristic, leading to a result such as that shown for low signal levels, such as represented by the solid line in FIG. 2.

If the loop gain does exceed unity at one or more mode frequencies, then oscillations will build up in the simple system under consideration, either from an external forcing input, or, lacking such an input, from residual thermal noise.

When the signal level exceeds a certain value, limiting will tend to prevent a further increase. Limiting may occur in a passive element specifically introduced into the loop for this purpose but will otherwise result from TWT saturation.

The effect of limiting is, in a sense, to shift the gain-versus-frequency curve downwards parallel to itself, as shown by the dotted line, until the curve intersects the unity gain index at the frequency, $T_0$, of the particular mode which has been excited.

The qualification "in a sense" is used because, when loop gain is tested with a single, low-level test signal in the presence of the strong limited signal, an argument using phasor diagrams will show that the weak signal comes through the limiter element with an additional nominal loss of 6 db relative to the strong signal. In this case, therefore, the loop gain curve of FIG. 2 should show an additional 6 db loss for signals other than the particular strong signal which has brought about the onset of limiting. This is the so-called "strong signal capture" effect.

The excess loss of amplitude by the weak signal is also accompanied by the generation of an image component of like amplitude. The image and the weak signal are (by definition) spaced symmetrically about the strong signal.

An alternative and useful point of view is that the weak signal, regarded as an unsymmetrical sideband of the carrier (the strong signal), is produced by a balanced mixture of phase and amplitude modulation. Passage through the limiter merely strips away the amplitude modulation component, leaving only a phase modulation component with its necessarily symmetrical sidebands. The sideband newly introduced in this way constitutes the image referred to above.

This point of view suggests the possibility that if two low-level signals are present and are symmetrically disposed with respect to the pre-existing strong "carrier" (the signal) so as to constitute, in effect, a phase modulation of the carrier, then passage through the limiter will not affect the index of phase modulation. There will have occurred, according to this point of view, merely a partial exchange of amplitude between the weak sidebands, each feeding the other.

Figure 2:
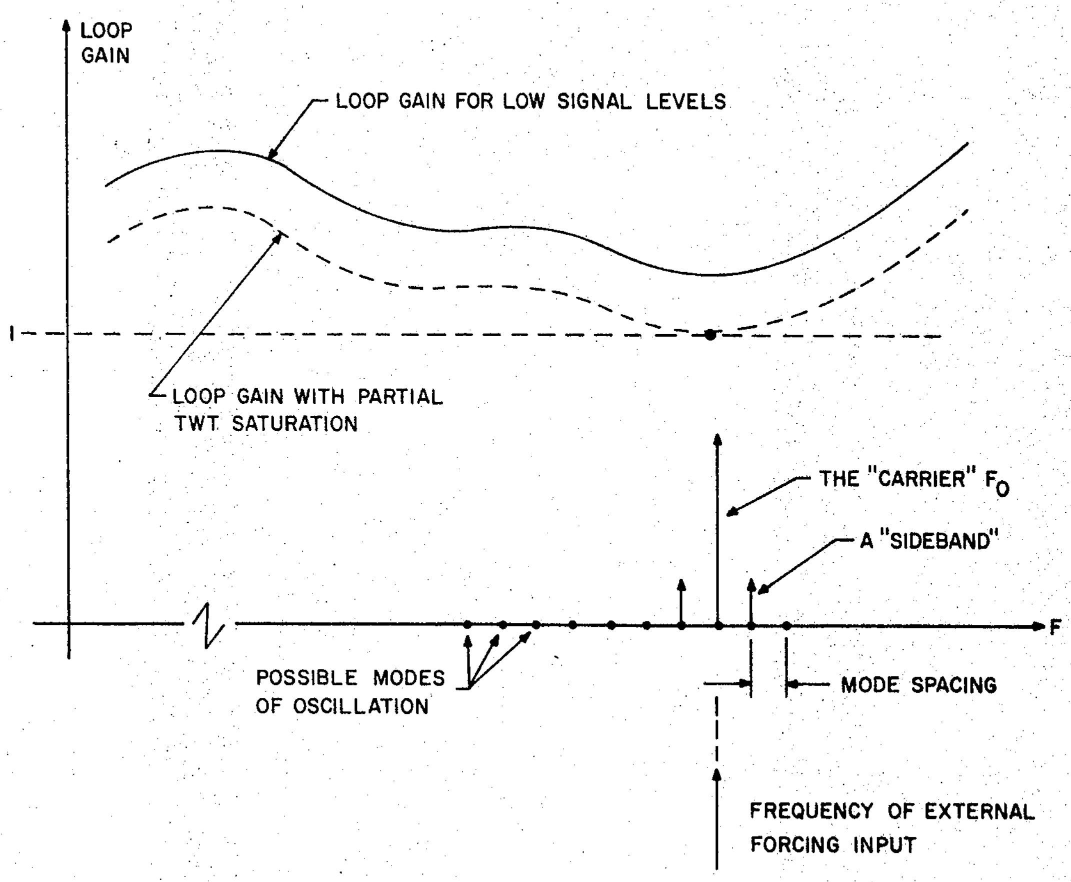
FIG. 2 is a graphic representation of the operation of the system of FIG. 1.

The example shown in FIG. 2 illustrates the case of a loop gain function that is concave upwards in the vicinity of the active mode. Thus, if the gain is just unity for the strong carrier, the average gain for the low-level sidebands will be somewhat greater than unity. And since, in the special case described above, the relative amplitudes of the sidebands will not diminish in passage through the limiter, the sideband amplitudes will increase with each passage around the loop. The initial sideband amplitude may have corresponded to thermal noise, but, in sufficient time, the sideband amplitude will increase to a value comparable to that of the original carrier. In fact, a particular sideband may assume the role of a carrier and proceed to grow its own sidebands. If the necessary conditions are fulfilled, the equilibrium state of the oscillator may bear no resemblance to the initial state which is clearly an unsatisfactory situation in a frequency memory.

It is this kind of phase instability which has limited the retention time of recirculating microwave memories to values believed to be of the order of tens of microseconds.

The present invention attacks the problem by, in effect, making the loop gain function strongly concave downwards in the frequency neighborhood of a strongly oscillating mode. Such a characteristic will demagnify any small-phase perturbations, and will lead therefore to phase stability.

Figure 3:
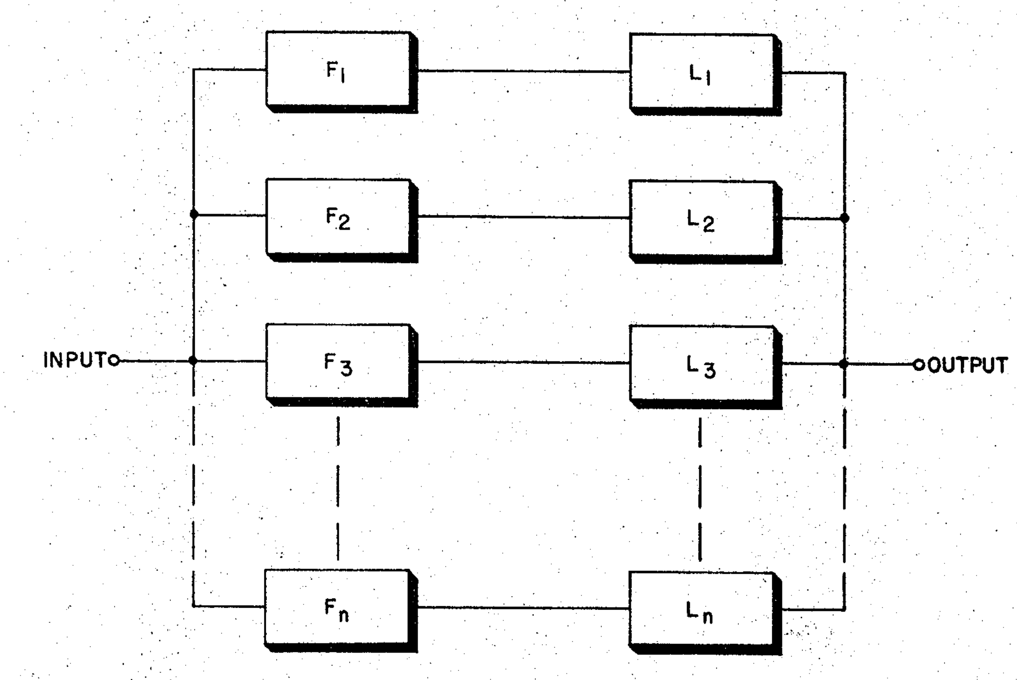
FIG. 3 is a schematic of one form of a frequency selective threshold.

For the purpose of achieving stability in this way, a device designated as a frequency-selective threshold is used. This device as defined and used herein is functionally equivalent to a parallel array of many filters, each filter encompassing a particular mode frequency and each followed by a conventional RF threshold. The threshold might be visualized as consisting of a waveguide magic T whose side arms are terminated with diodes balanced at low signal levels so that, except at high signal levels, there is little transmission from the E arm to the H arm. This threshold device is illustrated in FIG. 3 showing a plurality of filters $F_I$ through $F_n$ and associated RF thresholds $L_I$ through $L_n$.

Figure 4:
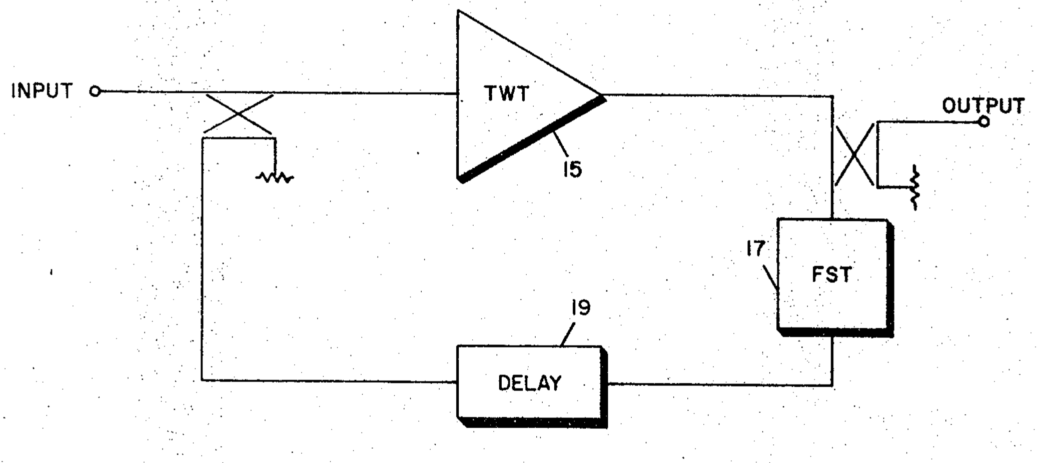
FIG. 4 is a schematic representation of the recirculating memory system of the present invention.
Figure 5:
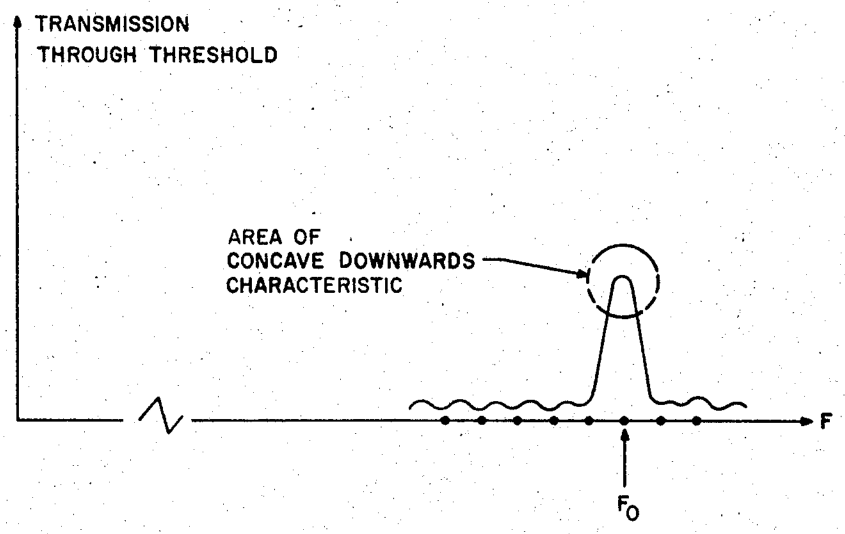
FIG. 5 is a graphic representation of a transmission through the threshold array of FIG. 4.

The use of such a device is illustrated in FIG. 4 with the loop comprising amplifier 15, threshold device 17 and delay 19. When such a device is properly adjusted, the loop gain at any mode frequency (and for low signal levels and thermal noise) will be substantially less than unity. The presence of a strong signal, resulting perhaps from a pulsed carrier input at or near a mode frequency, will overcome the threshold associated with that mode and the loop gain will be brought above unity for the mode. At the same time, and by virtue of the isolation provided by the array of mode filters, the thresholds associated with the adjacent modes will not be affected. Thus, the transfer through the threshold array will be sharply peaked at the frequency of the active mode, as shown in FIG. 5; e.g., the transfer characteristic will be strongly concave downwards in this neighborhood. Depending on the spacing of mode frequencies and the selectivities of the filters used, a net concave downwards characteristic could be assured for the loop as a whole, in spite of an accidental locally upward characteristic in the remaining portion of the loop. Thus, the frequency selective threshold would compensate for inevitable irregularities in the loop gain in regard to phase stability.

The mechanical implementation of such a composite threshold along the lines discussed and for any interesting number of modes, while feasible, is costly and cumbersome. The possibility arises, however, of a molecular implementation that would exploit phenomena occurring in magnetic resonance. For the microwave application, the use of a threshold device built around a commercially available yttrium iron garnet frequency-independent limiter hereinafter referred to as a YIG limiter, represents a preferred embodiment of the invention.

Figure 6:
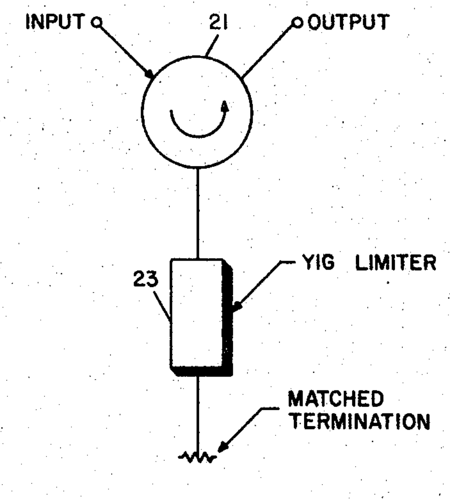
FIG. 6 is a schematic illustration of a limiter used as a threshold device.

The paradox of using a limiter to achieve a threshold characteristic is resolved by the observation that the insertion loss developed at higher signal levels by the YIG limiter is basically of the reflective rather than the absorptive type. In this respect, the limiter is similar to the simplest conventional microwave filters. Thus, if a wideband circulator 21 is combined with a YIG limiter 23 and a matched termination, as shown in FIG. 6, limiter 23 will present a matched termination to circulator 21 at low signal levels, thus preventing the through transmission of signals. However, a strong signal at a particular frequency, $F_o$, will induce limiting, but only in a small neighborhood of $F_o$. The input VSWR of the limiter will increase sharply for signals in this neighborhood, and incident energy will be reflected back through the circulator and into the loop. This will make possible the frequency selective transmission of signals through the circulator in the manner required in a frequency-independent threshold.

Figure 7:
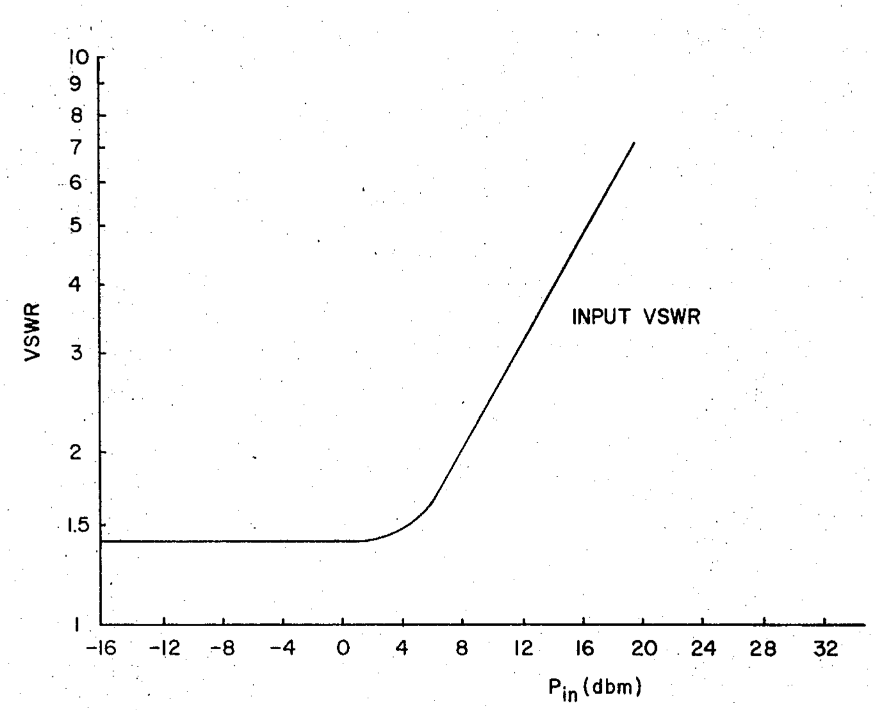
FIG. 7 is a graphic illustration of the variation of input VSWR with the signal level in the limiter of FIG. 6.

That a frequency-independent YIG limiter will indeed function in the manner described is borne out by the data plotted in FIG. 7. This figure plots input VSWR versus signal level for a particular unit. For signal levels below +4 dbm, the VSWR is less than about 1.4; with an ideal circulator this would lead to a low-level insertion loss greater than 15 dbm. The VSWR rises sharply about +4 dbm input. At, say, +12 dbm signal level, the return loss is reduced to 6 db. The same increase in VSWR with signal-level increase would be observed with other types of YIG limiters, but, of course, the numbers can vary over a wide range.

Figure 8:
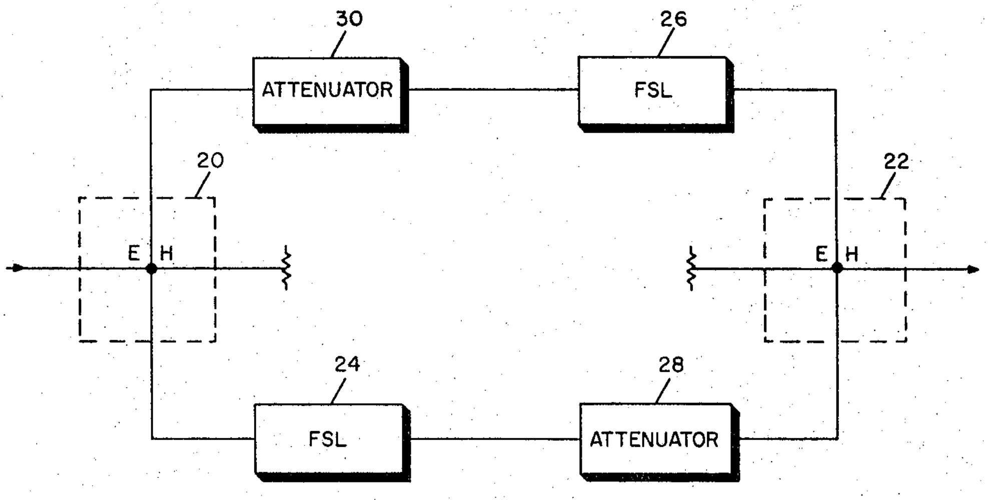
FIG. 8 is a schematic illustration of a further embodiment of a limiter used as a threshold device.

An alternative means for deriving a threshold characteristic from a frequency selective limiter may be obtained by incorporating the limiter in a microwave bridge circuit such as shown in FIG. 8. The bridge circuit comprises two magic-T elements 20 and 22, with the other arms comprising frequency selective limiters 24 and 26 together with attenuators 28 and 30.

The bridge is designed to be balanced at low signal inputs, giving rise to isolation between input and output. At signal levels above the onset of limiting, the limiter transfer characteristic is altered with a resulting bridge unbalancing which permits signals to be transmitted between the input and output of the bridge. Since this occurs in a frequency selective manner, the desired threshold characteristic is obtained.

The actual mechanism leading to the effects of frequency-independent limiting differs in the cases of EPR and ferrimagnetic resonance, and it is beyond the scope of this memorandum to describe the mechanism in detail. Such detail is described by K. Kotzebue in IRE Transaction, Microwave Theory and Techniques, Vol. MTT–10, Nov. 1962, pp. 516–520. It can be said, however, that in the case of a YIG (ferrimagnetic resonance) filter-limiter, the mechanism involves that portion of an essentially continuous spectrum of spin-wave modes in the YIG sample which falls at the first subharmonic (half frequency) of the RF passband. Through nonlinear coupling between the first order uniform precessional mode and selected ones of these spin-wave modes (a coupling which becomes increasingly effective as the signal level is increased), a point is reached where the spin-wave mode at the half frequency can be pumped parametrically by the applied RF energy. From this point on, further increases in RF input serve only to increase the amplitude in the spin-wave mode. There is no further increase in the RF energy coupled out of the filter, so that limiting occurs.

The all-important frequency-independent aspect arises from the plurality of spin-wave modes. Thus, the pumping by a first RF signal of the spin-wave modes falling at the half frequency has essentially no effect on other spin-wave modes corresponding to a second RF frequency. This picture is, of course, much over-simplified, and, in fact, there will be some interaction between spin-wave modes having proximate frequencies. This interaction limits the closeness with which two input frequencies can be brought together before the frequency-independent characteristic is jeopardized. For typical materials and devices, this critical separation is of the order of several megacycles. Thus, a practical mode spacing ΔF in the proposed frequency memory may also be taken to be of the order of several megacycles.

The limiter used as a frequency-independent threshold is the essential stabilizing element in the preferred memory. The addition of this form of threshold into the loop, illustrated in FIG. 4, leads to a memory in which the ultimate amplitude of the mode is limited by TWT saturation, implying a capability for long-term memorization of just one frequency at a time. For many applications, this capability may suffice.

Figure 9:
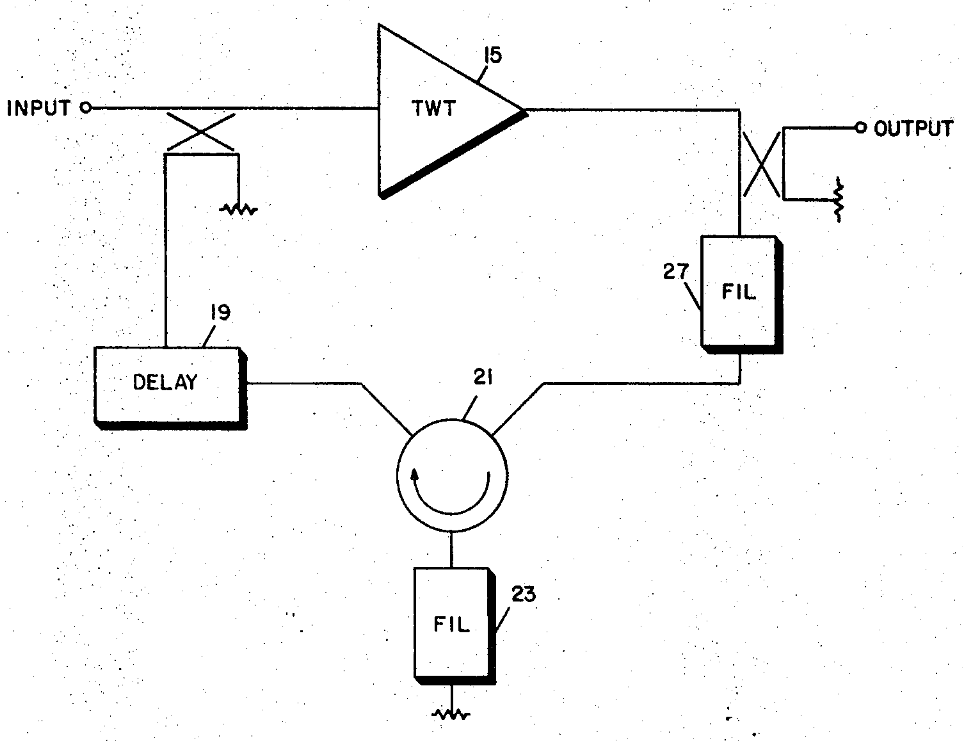
FIG. 9 is a schematic illustration of a threshold device having multifrequency capabilities.
Figure 10:
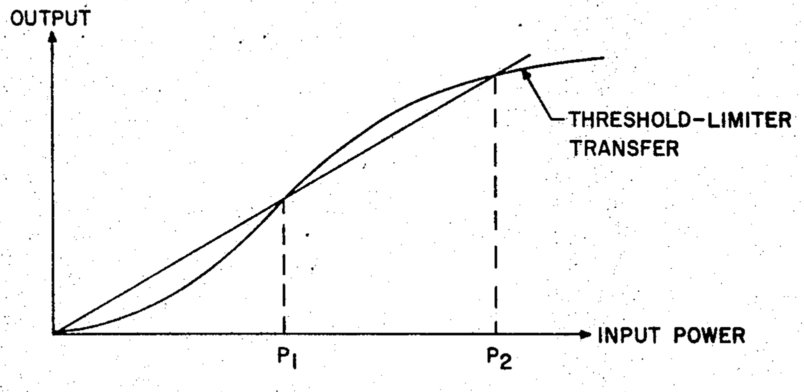
FIG. 10 is a graphic illustration of the limiter-threshold transfer function of the device of FIG. 8.

For other applications, however, a multifrequency capability may be desired. In this situation, it will be desirable to avoid TWT saturation and, instead, to operate the amplifier as a linear device, relying on a frequency-independent limiter placed in series with the loop to control the maximum amplitude of each mode. Such a configuration, one in which each mode is provided with, in effect, its own threshold and limiter, constitutes the most fully developed form of the proposed memory. FIG. 9 illustrates this form of memory with the additional frequency-independent limiter 27. In such form, the memory is functionally equivalent to an array of independent bistable oscillators, each of which requires only a triggering input at its frequency to initiate oscillation. The behavior of a particular oscillator is plotted in FIG. 10. The input/output characteristic of the threshold-limiter for the particular mode produces an S-shaped line in FIG. 10; the critical value of threshold-limiter insertion loss required to bring about unity loop again (e.g., marginally sustained oscillation) is plotted as a straight line.

For noise signals and other signals below the power level, P1, the loop gain is less than unity and the amplitude decays. A forcing input greater than P1 places the mode in a condition of loop gain greater than unit, and the mode amplitude grows until it is stabilized at the level, P2, corresponding to the intersection of the two characteristics.

The actual power level corresponding to P1 will depend on the characteristics of the threshold-limiter, on the TWT gain, and on the point in the loop at which forcing inputs are introduced. It would appear possible, however, to achieve a triggering sensitivity for the memory approximating that of a superheterodyne receiver having a like noise bandwidth of perhaps several megocycles. This means that, if desired, sensitivities in the neighborhood of −90 dbm. could be attained with practical TWT's.

The potential frequency resolution of the proposed memory is ultimately bounded by the selectivity of the threshold-limiter in a manner already discussed. Further, if the mode spacing is small in relation to the spectrum of an applied signal (e.g., if the applied signal is a strong short pulse), then several adjacent modes will presumably be triggered. This characteristic would possibly be desirable in a jammer application because it would represent a tailoring of the spot-jamming-signal spectrum width to the width of the intercepted signal. In applications where such an effect is not desired, it could be largely obviated by subjecting the input signals to conventional limiting prior introduction into the memory.

The potential operating frequency range of the proposed memory appears to be essentially that of available YIG limiters. One manufacturer has indicated the availability of a unit covering any selected 500 mcps. range in the inter 4500–6500.

These ranges may at the least be taken as an indication that the proposed memory is not a critically narrowband device. In fact, by paralleling several devices, a memory having a bandwidth of 3K mc. at X-band and a mode spacing of, say 2 mcps., is possible. This would represent an implementation by means of magnetic resonance at the molecular level of an array of perhaps 1500 microwave filters. The consequences for advanced microwave systems should be obvious.

There has been described several possible versions of the proposed memory. Before discussing applications, it might be noted that, although the loop delay of perhaps ⅓ to ¼ μsec. (corresponding to 3 to 4 mcps. mode spacing) could be provided by using coiled coax or waveguide, the newly avaliable YIG microwave delay lines, operable at room temperature and above, provide a highly compact and satisfactory fulfillment of the delay requirement.

Perhaps the simplest application of the proposed memory is in the receiving portion of a spot jammer that uses a TWA transmitter. In this system, illustrated in FIG. 10, the output of a receiving antenna 31 can be switched into the memory during a look-through period. Then, when one or more pulses have been received and have triggered modes in the memory (the relative time of arrival of the input pulses does not matter), the input can be switched off and a sample of the loop signal made available to the TWA power amplifier driver. In the driver 35 of the power amplifier, noiselike phase- and/or amplitude-modulation can be added as desired for further amplification and transmission as a spot jamming signal.

At the end of the jamming interval, the memory can be erased by momentarily depressing the gain of the loop TWT. This prepares the memory for reacquisition of a threat signal during a look-through interval.

Such a system would provide a high degree of frequency selectivity for increased jamming watts per megacycle, and would have the high intercept probability characteristic of wide-open receivers. Additionally, it would be unusually simple to implement in that the essential element, parallel organization, occurs at the molecular level; i.e., in the spin-wave spectrum of the special purpose threshold-limiter device.

Figure 11:
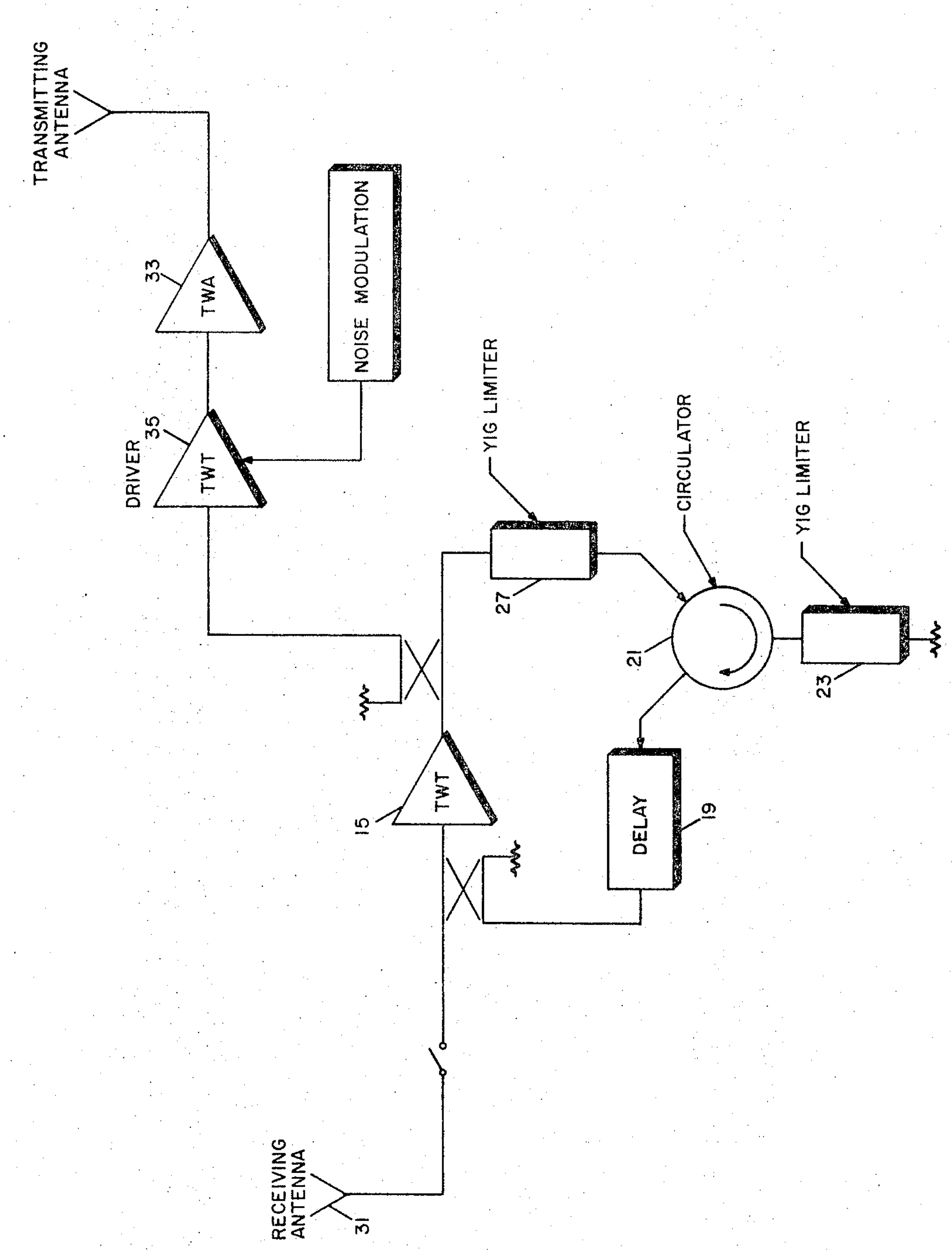
FIG. 11 is a schematic illustration of a multi-spot jammer using the present invention.
Figure 12:
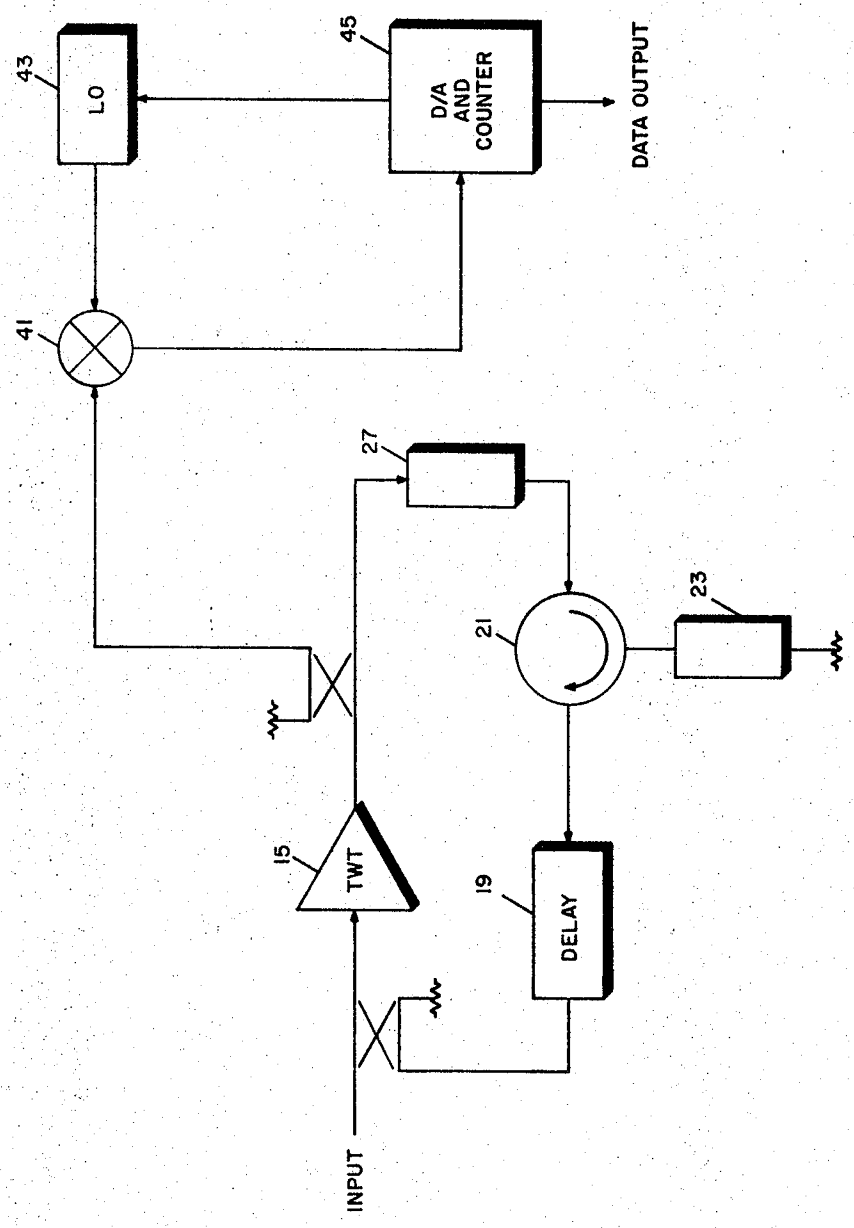
FIG. 12 is a schematic of superheterodyne receiver using the present invention.

For many applications, greater sophistication in operation is required in that some reduction of frequency information to analog or digital form is necessary. In these cases, the alternative approach shown in FIG. 11 can be used. Here, the memory is, in effect, a buffer store for a conventional swept-superheterodyne receiver. This combination overcomes what is really the main limitation of the superheterodyne receiver-low intercept probability. In this version, a sample of the loop signal is applied to a mixer 41, the second input of which is taken from a controllable local oscillator 43; e.g., a low-level BWO or VTM. The oscillator 43 may be swept up in frequency by means of a control voltage derived from a D/A converter 45. The converter may be driven by a clocked digital counter, and when the mixer output approaches a zero beat (indicating a coincidence between the LO frequency and the frequency of one of the activated modes), the contents of the digital counter are transferred to a memory. It is clearly practical to do this for a plurality of stored frequencies and, in a somewhat different version of the system, to use analog instead of digital storage.

In still another application of the memory, a signal stored in the loop can be used as the reference input to a phase discriminator, the second input of which is taken from a carcinotron BWO. The output of the phase discriminator can be used in a phase-lock loop to synchronize the BWO frequency with that stored in the loop to an accuracy substantially better than could be achieved through reliance on the somewhat erratic voltage-frequency characteristic of a typical BWO. By using a broadband phase-lock loop, some amount of purposeful phase modulation of the BWO output could be accommodated. Again, it would be possible to control several BWO's in this manner.

An interesting variation of the superheterodyne readout technique makes use of a narrow-band, tunable YIG filter. In this case, the limiting characteristic of the filter is ignored. It is merely included in the loop by using a circulator, as shown in FIG. 6. At the frequency to which it is tuned, it diverts any signal stored in the loop to an auxiliary crystal detector, producing a short pulse output from the detector at the moment of diversion. At the same time, of course, the mode in question is quenched; i.e., the readout is destructive.

With this arrangement, continuous read in and read out from the memory would be possible, and there would be no need to quench the entire loop periodically. This characteristic could have significance in reconnaissance applications.

Figure 13:
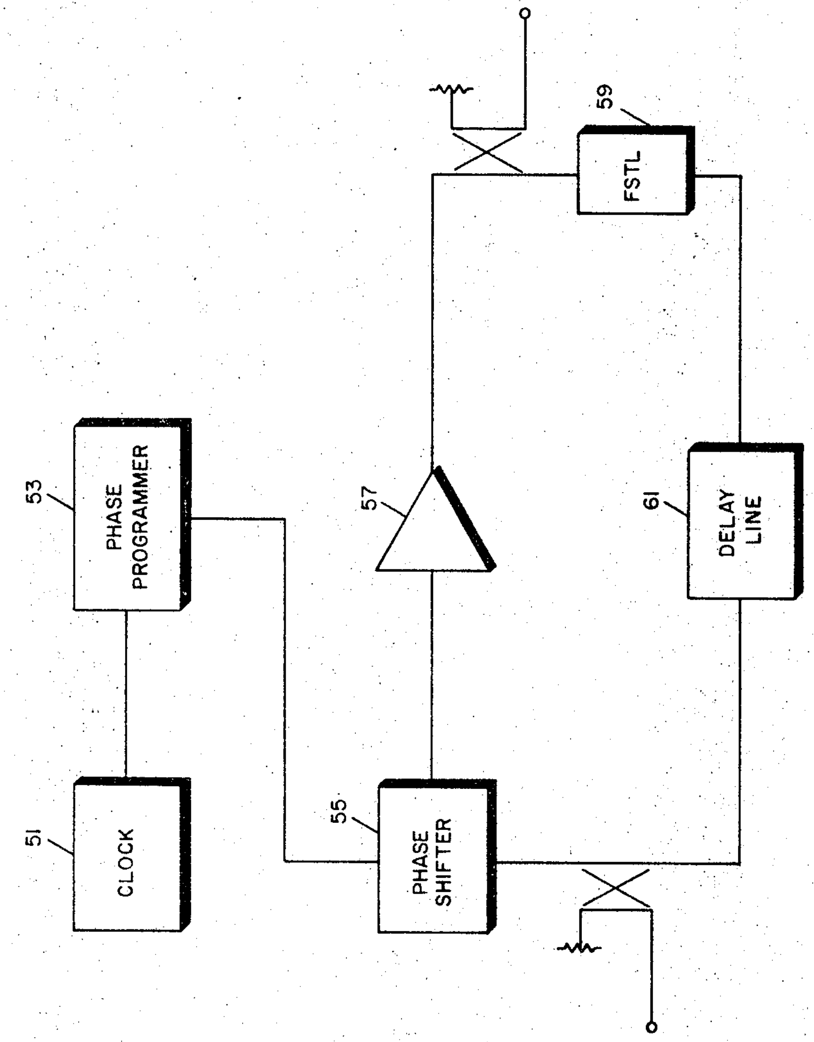
FIG. 13 is a schematic illustration of loop phase shift using frequency selective limiters.

A further concept which may be of interest in certain specialized applications of the proposed memory is that of systematically translating the pattern of active modes. This can be done by programming the phase shift around the loop; i.e., by suitably controlling the helix voltage on a TWT so as to increase phase slowly through 360° and then resetting the phase suddenly. Such a system is shown schematically in FIG. 13 wherein the loop comprises phase shifter 55, amplifier 57, frequency selective threshold limiter 59 and delay line 61. Clock 51 controls phase programmer 53 which controls phase shifter 55. By programming the loop phase-shift through one cycle of a sawtooth waveform having a total excursion of 360°, the pattern of the excited can be shifted either up or down (depending on the polarity of the sawtooth) by one mode number. The maximum possible shifting rate is approximately the mode spacing. The net effect is that of a digital shift register which could be used in certain types of digital data processors and computers.

Although a number of possible uses have been discussed above, no limitation of the invention is intended thereby. Other applications of the present invention will now be obvious. Accordingly, the invention is to be limited only by the scope of the following claims.

I claim:

1. A microwave frequency memory system comprising,
an amplifier coupled between input and output terminals,
a wide band circulator coupled to said output terminal, a magnetic resonance type frequency selective limiter coupling said circulator to a matched termination, and
a delay line connecting the output of said frequency selective limiter to the input terminal of said amplifier.

2. The memory system of claim 1 wherein said frequency selective limiter is a yttrium iron garnet limiter.

3. The memory system of claim 1 further comprising,
a second magnetic resonance type frequency-selective limiter coupled between said output terminal and said circulator.

4. The memory system of claim 1 further comprising,
means for programming a phase shift about the loop created by said amplifier, limiter and delay line, so as to provide an asynchronous binary shift register output.

References Cited

UNITED STATES PATENTS

| | | | |
|---|---|---|---|
| 2,770,722 | 11/1956 | Arams | 325—11 X |
| 3,058,070 | 10/1962 | Reingold | 333—1.1 X |
| 3,147,427 | 9/1964 | Varian | 333—24.2 |
| 3,187,258 | 6/1965 | Zolnik | 325—6 X |
| 3,225,300 | 12/1965 | Barney | 325—6 X |
| 3,299,376 | 1/1967 | Blau | 333—24.1 X |
| 3,453,563 | 7/1969 | Maurer | 333—24.1 |

TERRELL W. FEARS, Primary Examiner

U.S. Cl. X.R.

333—29